United States Patent
Kalapatapu et al.

(10) Patent No.: US 10,477,503 B2
(45) Date of Patent: Nov. 12, 2019

(54) DEMOCRATIZED CELLULAR NETWORK CONNECTIVITY THROUGH SMALL CELLS

(71) Applicant: Google LLC, Mountain View, CA (US)

(72) Inventors: Dutt Kalapatapu, Santa Clara, CA (US); Ankur Jain, Mountain View, CA (US); Hassan Sipra, San Jose, CA (US); Mitchell Trott, San Mateo, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/187,880

(22) Filed: Jun. 21, 2016

(65) Prior Publication Data
US 2017/0150470 A1 May 25, 2017

Related U.S. Application Data

(60) Provisional application No. 62/258,128, filed on Nov. 20, 2015.

(51) Int. Cl.
*H04W 60/00* (2009.01)
*H04W 28/02* (2009.01)
*H04W 48/18* (2009.01)

(52) U.S. Cl.
CPC ..... *H04W 60/005* (2013.01); *H04W 28/0215* (2013.01); *H04W 28/0226* (2013.01); *H04W 28/0236* (2013.01); *H04W 48/18* (2013.01)

(58) Field of Classification Search
CPC ..... H04W 48/18; H04W 88/06; H04W 36/14; H04W 48/16; H04W 84/12;
(Continued)

(56) References Cited

U.S. PATENT DOCUMENTS

2004/0131078 A1* 7/2004 Gupta ................ H04L 12/5692
370/466
2007/0259678 A1 11/2007 Kuk et al.
(Continued)

FOREIGN PATENT DOCUMENTS

EP 2706790 A1 3/2014
JP H06296161 A 10/1994
(Continued)

OTHER PUBLICATIONS

International Search Report and Written Opinion for PCT Application No. PCT/US2016/061115, dated Mar. 31, 2017. 12 pages.
(Continued)

*Primary Examiner* — Ernest G Tacsik
(74) *Attorney, Agent, or Firm* — Lerner, David, Littenberg, Krumholz & Mentlik, LLP (57) ABSTRACT

A system and method provide for connectivity to multiple network operators at a given time, and sorting outgoing traffic based on criteria associated with the data and the network operators. Available networks are identified, and a mobile device attaches to a first network for communication through a first application, and also attaches to a second network for communication through a second application, without requiring detachment from the first network. Accordingly, traffic for the first application is steered through the selected first network, and traffic for the second application is steered through the second network.

24 Claims, 9 Drawing Sheets

(58) Field of Classification Search
CPC .. H04W 76/025; H04L 12/5692; H04L 45/38; H04L 45/123
See application file for complete search history.

(56) References Cited

U.S. PATENT DOCUMENTS

| | | | | |
|---|---|---|---|---|
| 2008/0267376 A1* | 10/2008 | Khasnabish | ......... | H04M 3/367 379/201.01 |
| 2011/0286395 A1* | 11/2011 | Liebsch | ............... | H04W 40/18 370/328 |
| 2012/0129513 A1* | 5/2012 | van der Laak | ....... | H04W 4/001 455/419 |
| 2013/0044709 A1* | 2/2013 | Adjakple | .............. | H04W 76/15 370/329 |
| 2013/0329639 A1* | 12/2013 | Wietfeldt | ............. | H04W 88/06 370/328 |
| 2015/0005033 A1* | 1/2015 | Petersson | ............ | H04B 1/3816 455/558 |
| 2015/0085650 A1 | 3/2015 | Cui et al. | | |
| 2015/0119061 A1 | 4/2015 | Saito | | |
| 2015/0215832 A1* | 7/2015 | Fitzpatrick | ........... | H04W 48/18 455/426.1 |
| 2016/0020914 A1* | 1/2016 | Moore | ................ | H04L 12/1428 705/40 |
| 2016/0157147 A1* | 6/2016 | Saghir | ................... | H04W 36/04 455/444 |
| 2016/0295614 A1* | 10/2016 | Lee | ....................... | H04W 48/08 |

FOREIGN PATENT DOCUMENTS

| | | |
|---|---|---|
| JP | 2010045824 A | 2/2010 |
| JP | 2014168129 A | 9/2014 |
| JP | 2015082832 A | 4/2015 |
| JP | 2015095789 A | 5/2015 |
| JP | 2015109509 A | 6/2015 |
| JP | 2015167266 A | 9/2015 |
| JP | 2015527774 A | 9/2015 |
| WO | 2005062652 A1 | 7/2005 |
| WO | 2013188545 A1 | 12/2013 |
| WO | 2015003125 A2 | 1/2015 |

OTHER PUBLICATIONS

Office Action for Japanese Patent Application No. 2018-507546 dated Jul. 16, 2019.
English Translation of Office Action for Japanese Patent Application No. 2018-507546 dated Jul. 16, 2019. 6 pages.

* cited by examiner

DEMOCRATIZED CELLULAR NETWORK CONNECTIVITY THROUGH SMALL CELLS

CROSS-REFERENCE TO RELATED APPLICATIONS

The present application claims the benefit of the filing date of U.S. Provisional Patent Application No. 62/258,128 filed Nov. 20, 2015, the disclosure of which is hereby incorporated herein by reference.

BACKGROUND

Current small cells and femto cells provide extended coverage for a mobile operator. However, a user on a network can get access to the network only if allowed by a macro operator. This lends to an operational model where the user is tied to a macro operator and does not allow for smaller operators to provide independent service.

BRIEF SUMMARY

User Equipment (UE) or a subscriber of the UE may select a particular type of network, from a variety of available network types, to which the UE should have access.

One or more subscription profiles may be dynamically provisioned on the UE based on high-fidelity measurements and statistical data of past performance from the network. The device should determine the optimal mode of connectivity for a given position at a given time. There may be more than one simultaneous connection maintained by a device.

Connection and authentication of the UE to the network may be independent of how the user is authorized and charged for use of the network. The user may maintain multiple authorization domains, independent of the method of network attachment, that can be dynamically changed without requiring changes to credentials on the device for authentication.

The UE may transition between networks based on current network conditions. Applications on the UE may steer traffic to and from a current best network.

Local optimizations within federated access and closed mobility domains can continue to exist (e.g., intra-radio access technology (RAT) and inter-RAT mobility in long-term evolution (LTE)). However cohesiveness and mobility between unfederated network domains is achieved by connection management on the UE. The network configuration in this case resolves to a much simpler case where the networks themselves are disjoint. UEs can use small mobile operators for some types of traffic, while at the same time using local/national operators for other types of traffic.

One aspect of the disclosure provides a system, comprising a memory and one or more processors in communication with the memory. The one or more processors are configured to identify available networks, select a first network for communication through a first application, attach to the selected first network, select a second network for communication through a second application, the second network being different from the first network, and attach to the selected second network, without requiring detachment from the selected first network. Further, the one or more processors are configured to steer traffic for the first application through the selected first network, and steer traffic for the second application through the selected second network.

Another aspect of the disclosure provides a method, comprising identifying, with one or more processors, available networks, selecting, with the one or more processors, a first network for communication through a first application, and attaching to the selected first network. Further, the one or more processors select a second network for communication through a second application, the second network being different from the first network, and attach to the selected second network, without requiring detachment from the selected first network. The method further includes steering, with the one or more processors, traffic for the first application through the selected first network, and steering, with the one or more processors, traffic for the second application through the selected second network.

Yet another aspect of the disclosure provides a user equipment, comprising a memory storing a plurality of subscription profiles, each subscription profile corresponding to a different network operator and including information for connecting to the network operator. The user equipment further includes a modem adapted to attach to multiple networks at a same time, the modem configured to periodically receive information identifying different types of available networks, and a processor in communication with the memory and the modem, the processor configured to select one of the identified available networks, based at least on the stored subscription profiles, and instruct the modem to attach to the selected network. Even further, the user equipment may include a policy engine configured to determine which network, of a plurality of networks to which the modem is attached, to use for transmitting data, the determination being based on one or more conditions associated with the data and the plurality of networks, and a flow selector in communication with the policy engine, the flow selector configured to sort the data based on the determination by the policy engine.

A further aspect of the disclosure provides a non-transitory computer-readable medium storing instructions executable by one or more processors to perform a method, comprising identifying available networks, selecting a first network for communication through a first application, and attaching to the selected first network. Further, the instructions provide for selecting a second network for communication through a second application, the second network being different from the first network, and attaching to the selected second network, without requiring detachment from the selected first network. The instructions further provide for steering traffic for the first application through the selected first network, and steering traffic for the second application through the selected second network.

DETAILED DESCRIPTION

LTE small cell networks will be deployed within coverage of macro networks, and require seamless mobility for handling real-time voice and video traffic as users transition between macro and small-cell and vice versa. However, operator-neutral small-cell and Macro networks belong to different administrative and operational domains, and network coordinated seamless mobility requires a deep level of trust and information exchange to exist between two autonomous networks. One solution is a mobile network operator (MNO) centric approach. Another solution is UE-centric.

Figure 1:
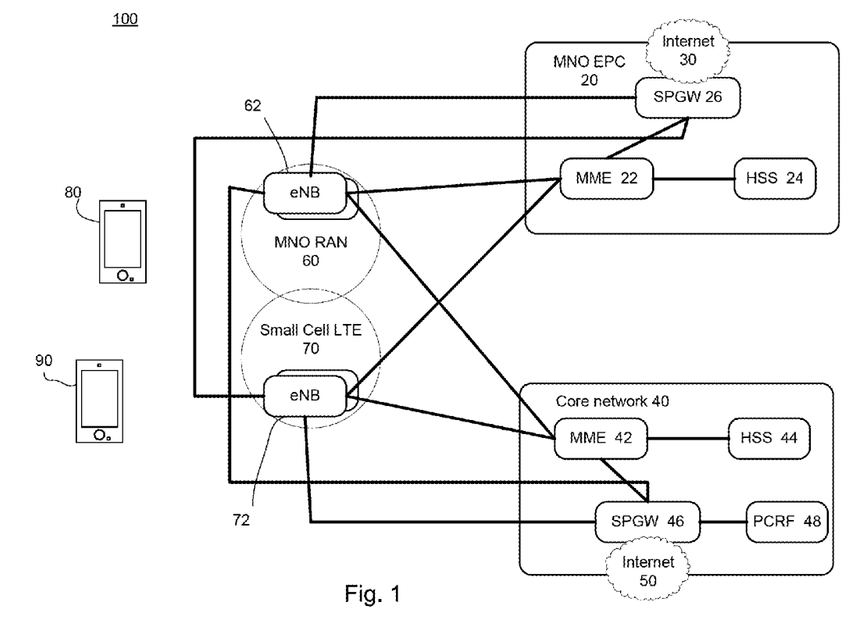
FIG. 1 is a block diagram of an example system according to aspects of the disclosure.

FIG. 1 illustrates an example of the MNO-centric approach. System 100 includes an MNO evolved packet core (EPC) 20 supporting an MNO radio access network (RAN) 60, as well as a second EPC 40 supporting another network, such as a small cell LTE 70. User device 80 may be a first type, such as a device holding an MNO-administered SIM. User device 90 may be a second type, such as a device holding a small cell-administered SIM.

Each EPC 20, 40 includes a number of components. For example, MNO EPC 20 includes mobility management entity (MME) 22, home subscriber server (HSS) 24, and Serving Gateway/PDN Gateway (SPGW) 26 to Internet 30. The second EPC 40 may include, for example, MME 42, HSS 44, SPGW 46 to Internet 50, and policy and charging rules function (PCRF) 48. These components may be used to provides support to each network 60, 70. For example, as shown in FIG. 1, the MME 22 and the SPGW 26 of the MNO EPC 20 are coupled not only to eNode-B (eNB) 62 of the MNO RAN 60 but also to eNB 72 of the small cell network 70. Similarly, MME 42 and SPGW 46 of the second network 40 supporting the small cell 70 may also be coupled to the eNB 62 of the MNO RAN 60. In this regard, even if the user device 90 only holds a small cell-administered SIM, it may connect to the MNO RAN 60. For example, SIMs may further be affiliated with a mobile virtual network operator (MVNO). For users with a small-cell SIM and international mobile subscriber identity (IMSI), the small cell network 70 is presented as a general MVNO on the partner MNO and extended back to the second core network 40. The general MVNO is in turn used to provide service to other MVNOs riding on top of it by virtue of segmentation of IMSI ranges to each delegated sub-MVNO. Device logic may be used to select the appropriate RAN for MVNO users, or the MNO also serves the small cell public land mobile network (PLMN) on their network 60. In this way, a single small cell MVNO from the perspective of an MNO exists, whereas the demultiplexing of the generic MVNO into component sub-MVNOs is performed within PCRF 48.

Similarly, while in the previous example the user device 80 only holds an MNO-administered SIM, the user device 80 may nevertheless connect to the small cell LTE network 70. The user device 80 may appear as another MVNO the general MVNO. For example, this may be accomplished with public land mobile network (PLMN) equivalence on the network 70 and PLMN-based MME selection on the eNBs 72.

In the example above, the second core network 40 and the MNO core 20 share spectrum access on the eNBs 62, 72, but independently manage network mobility and policy and charging enforcement. However, it requires deep integration at the eNBs 62, 72 themselves, where to each network 60, 70, the corresponding network appears as a symmetric extension of itself under a different administrative domain. Implementation of this MNO-centric approach may be facilitated by, for example, more intelligent cell-selection procedures, allowing a UE to be paged from more than one network at once (e.g., generalized Idle Mode Signaling Reduction) or allowing one RAN to page on behalf of another, etc.

A device connected with an MNO domain is desired to have seamless mobility, such that transitions between radio nodes is transparent to applications on the device. In one example, a set of tightly controlled procedures may be orchestrated jointly by the network and UE. Examples of such procedures may include transfer of measurement reports to make handover decisions, signaling messages to coordinate handovers of network and radio level resources, joint RAN management across the invisible seam so that coverage transitions matchup, etc. However, a large set of parallel, disjoint wireless Internet networks also exist which do not partake in the mobility management mechanics of monolithic cellular networks and yet carry a large volume of mobile user data. Accordingly, applications adapt by using application-layer buffering or retransmission. While monolithic mobile networks are built to facilitate seamless mobility, this type of mobility is primarily useful only for a small subset of low-loss transactional applications (e.g., voice/video calling, online gaming, etc.).

According to one example, wireless Internet calling may help improve transitions between cellular and wireless internet networks at a network transport layer. In this example, wireless Internet calling is used to facilitate transitions at the network transport layer between cellular and wireless Internet networks.

Other methods for maintaining seamless network handovers may require the UE to maintain separate network contexts and attach simultaneously to two or more networks and implement its own form of traffic steering. Network selection may be controlled by the UE.

In this method, intelligent network discovery and attachment may be performed by the UE. A lightweight method dynamically provisions one or more subscription profiles on the UE. Based on high-fidelity measurements and statistical data of past performance from the network, the UE should determine the optimal mode of connectivity for a given position at a given time. There may be more than one simultaneous connection maintained by a device. Dynamic subscription and credential management may allow a user to maintain multiple authorization domains independent of the method of network attachment that can be dynamically changed without requiring changes to credentials on the UE for authentication. Network switching may be based on current network conditions, and traffic may be subsequently steered such that applications use the current best network.

Figure 2:
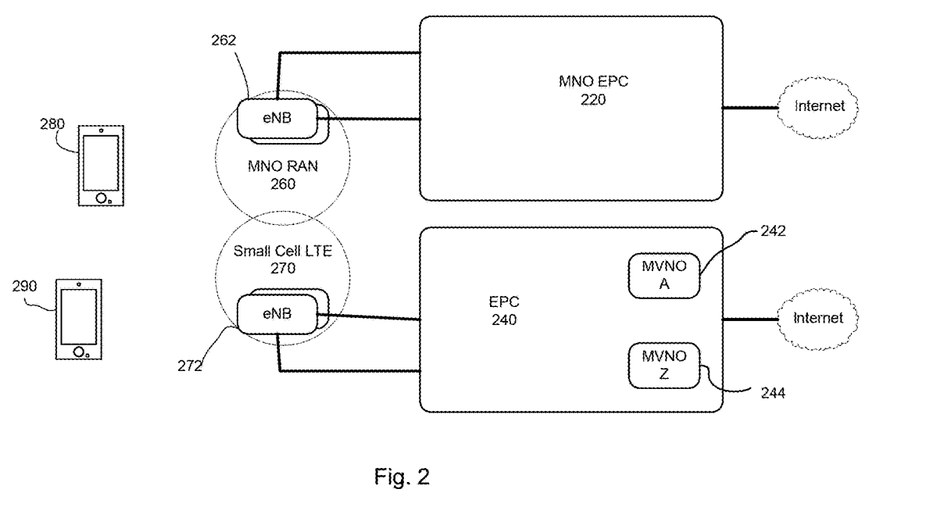
FIG. 2 is a block diagram of another example system according to aspects of the disclosure.

FIG. 2 illustrates an example of a UE-centric system for democratized cellular network connectivity. In this example, MNO core network 220 supports MNO radio access network 260, including eNBs 262. Another core network 240 supports a small-cell LTE network 270, including eNBs 272. The another core network 240 may be an EPC, including a number of subcomponents, but may be under different ownership than the MNO core network 220. One or more MVNOs 242, 244 may operate within the another core network 240. The MVNOs 242, 244 may be, for example, cable operators, enterprises, utilities, municipalities, original equipment manufacturers (OEMs), etc. The one or more MVNOs 242, 244 may provide service on democratized LTE small-cell networks, such as the small cell network 270, that are operated independently relative to MNO macro-cellular networks, such as the MNO RAN 260. According to one example, each of the democratized small-cell networks may be run by the same entity.

Each of user equipment 280, 290 may be operable to communicate with either or both of MNO RAN 260 or small cell LTE 270. For example, each UE 280, 290 maintains multiple subscription profiles for each of the networks 260, 270 it is entitled or authorized to connect to. These networks are expected to be disjoint and the intelligence to discover networks and switch/steer traffic between them resides within the UE 280, 290.

Figure 3:
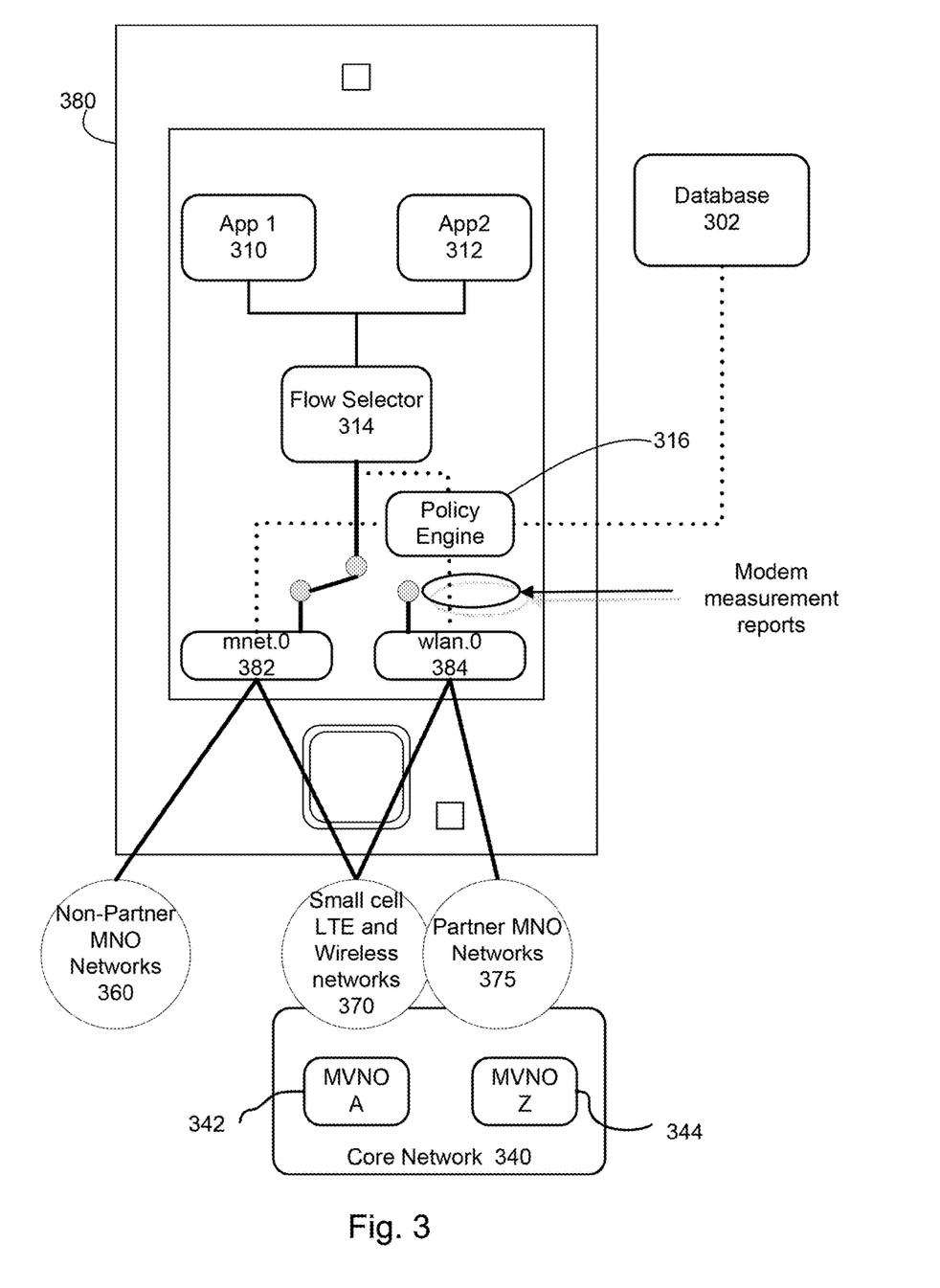
FIG. 3 is a block diagram of another example system according to aspects of the disclosure.

FIG. 3 illustrates an example UE 480. The UE 480 is capable of low-latency network switching by applications (e.g., Quick USP Internet Connections (QUIC) zero-round trip time (RTT) retransmit), as well as simultaneous use of multiple networks with transport or application layer multipathing (e.g., using multipath TCP or QUIC multipath) overlaid above the network layer to federate a set of distinct access domains.

The UE 480 may be any type of mobile computing device, such as a smartphone, tablet, laptop, gaming system, or the like. The UE 480 runs one or more applications 310, 312. The UE 480 is also connected to a plurality of networks. For example, the UE 480 is connected to MNO network 360 through interface 382, and to small cell LTE and wireless network 370 through interfaces 382, 384. Moreover, the UE 480 may also be coupled to one or more partner MNO networks 375 through interface 384. The partner MNO networks 375 may have relationships with the small cell LTE and wireless networks 370 such that the networks 370, 375 share the same core network 340. For example, partner MNO network 375 may be a large cellular phone carrier which owns the equipment in the core network 340, while the small-cell LTE network 370 has an agreement with the carrier whereby it shares the equipment in the core network 340.

Each of the applications 310, 312 may utilize different types and amounts of data. For example, one application may be a video-streaming application or a voice over Internet Protocol application, while another is a social network application or a health or news application. In addition to having different types and amounts of traffic, the frequency and duration of which the applications 310, 312 are used by a user may vary. Accordingly, it may be desired to use different networks for the different applications 310, 312. For example, networks may provide data at different costs. Accordingly, it may be desirable to only use high-volume traffic applications on networks where data is inexpensive or free, while other lower-volume traffic applications can be used on any network, even when data is more expensive.

Flow selector 314 may determine which network 360, 370, 375 to use for serving a particular application 310, 312. The flow selector 314 may be, for example, a software module programmed on the UE 480. The determinations made by the flow selector 314 may be based on, for example, user input, network pricing, type of traffic, traffic volume, network signal strength, signal quality, statistical/historical data, state of the UE, conditions surrounding the UE, or any combination or these or other criteria. A chart of some example parameters is provided below, but it should be understood that this chart is not an exhaustive list of possible parameters:

| Parameter | Example implementation |
|---|---|
| Reference Signal Received Power (RSRP). | Getting continuous signal strength may be a battery drain and having a subscription when the RSRP is within a threshold may help reduce power as well as help in network selection. Connected cell RSRP = X -> Y example: RSRP between −90 dBm to −105 dBm, indicating a good network |
| Reference Signal Received Quality (RSRQ) | Connected cell RSRQ = X -> Y example: RSRQ between −9 dBm to −12 dBm, indicating a good network |
| Signal to Interference-plus-Noise Ratio (SINR) | SINR > X Example: SINR > 6 |
| LTE Link Quality Estimation indicating link capacity. | LQE > X (1-7) |
| Ordered PLMN list | {(310, 582), (310, 580), (310, 312)} List of PLMN's that are of interest, for example: MCC-MNC 310-582. Scanning may be started in a particular Geo location (home/Office/enterprise) for this network. |
| CSG Identity | Used to identify a femto cell that is of interest. |
| VoLTE/e911 capability | Flag to identify whether a network has native reachability to IMS and supports dedicated bearers (e.g. IMS PDN connection) |
| UE scanning reports | Idle mode measurements containing an ARFCN, a time stamp, and a list of per-cell Results. Each per-cell result contains: PCI Cell Global ID TAC PLMN identity list RSRP RSRP measurement accuracy (90% confidence interval, dB) RSRQ RSRQ measurement accuracy (90% confidence interval, dB) CSG identity |
| Signal strength. | RSSI < X example: RSSI less than −70 dBm Instead of continuous monitoring, a condition may trigger signal strength measurement, thereby improving battery performance |
| Organizationally Unique Identifiers (from Roaming Consortium) | When a certain OUI is observed (in Beacon) |
| Geo-cached data | Statistical/Historical data that is available at UE. |
| Geo Fence | Upon reaching the Geo Fence, attach to the network. |
| Traffic Type | Type of traffic that is being used, for example: Voice/Video/Data etc |
| Movement | Whether the UE is moving. Example: Walking, Running, Car, Train etc |
| Cost | $ cost per byte |

According to some examples, the criteria for determining which network to use may be handled by policy engine 316, while the flow selector 314 sorts traffic between the appropriate applications and networks based on the criteria. For example, policy engine 316 may include a plurality of rules for traffic steering. The rules may be predetermined, generated by the user, or created in response to particular conditions. In this regard, the policy engine 316 may communicate with database 302 to obtain relevant information, such as statistical or historical data. The handling of any two disjoint networks, whether they both be LTE, both be wireless Internet, or a combination, may conform to the same set of rules and policies.

By way of example only, traffic steering may be based on a cost of data. A device may be connected to two different networks, where each network has a different a cost per byte of data transmitted or received by the device. For example, the device may connect to a first mobile network operator (MNO1) with data costing $10 per gigabyte, and may also connect to a second MNO (MNO2) with data costing $5 per gigabyte. The policy engine can be programmed, for example by the user, manufacturer, etc., to select the lowest cost network.

According to another example, traffic steering may be based on network quality. An application that is latency sensitive, such as voice or video, may choose RSRP, SINR, and combination of the rules to determine the best quality network to steer the traffic. For example, a UE may be connected to MNO1 and MNO2. At a particular time, location, etc., MNO1 radio measurements may be better than MNO2 radio measurements. Accordingly, the policy engine could select MNO1 based on the radio characteristics.

In a UE centric, operator-neutral, LTE small-cell network, a user may select service from among a set of carriers that provide service, each with potentially different business models. The user may simultaneously maintain subscriptions belonging to multiple operators, such as small-cell MVNO and MNO macro, and should be able to change their subscriptions on-demand in a democratized network. Subscriptions should be dynamically provisioned to new users in the democratized access model.

Network subscriptions include authentication/authorization keys, identity of the subscriber, and profile information. The subscription information is stored in an electronic Universal Integrated Circuit Card (eUICC) or a SoftSIM or a secure element.

Figure 4:
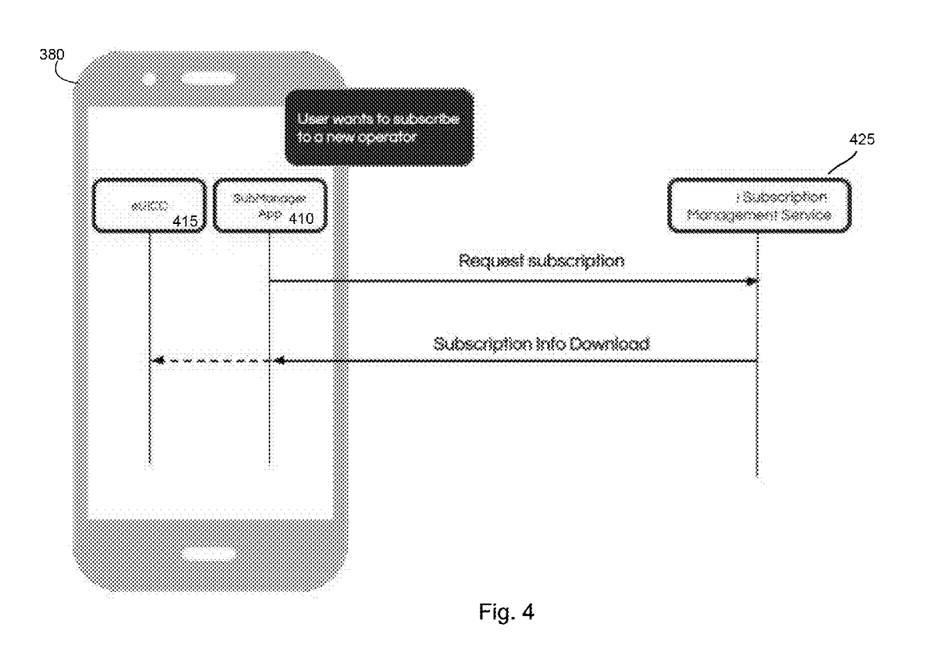
FIG. 4 illustrates a subscription process according to aspects of the disclosure.

FIG. 4 depicts a simple over-the-air (OTA) flow describing provisioning of a UE subscription. The UE 480 includes a subscription manager application 410. The subscription manager application 410 sends a request for subscription to subscription management service 425. According to some examples, the subscription management service 425 may be operated by an operator of one or more of the small-cell networks. The subscription management service 425 responds to the request by sending subscription information to the subscription manager application 410. The subscription information may include, for example, a profile containing a password and other information for connecting to an operator. This information may be stored in eUICC 415, or in another secure and tamper proof element, such as a SoftSIM or eUICC contained in a secure element. This information may be accessed by, for example cellular and wireless Internet modems for attach and authentication procedures.

Figure 5:
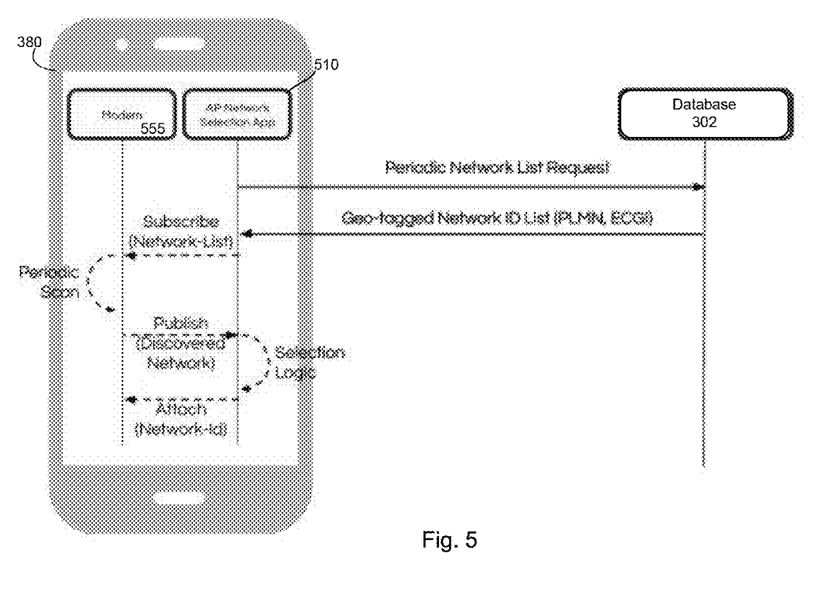
FIG. 5 illustrates a network discovery process according to aspects of the disclosure.

FIG. 5 illustrates an example of network discovery by the UE 480. Once subscription profiles have been pushed to the UE, the UE 480 should be able to discover the available networks to which it may connect. An application processor (AP) network selection application 610 runs on the UE 480, and periodically requests a list of available networks. The request may leverage information from, for example, stored subscription profiles and database 302, which may store geo-cached data. In response to the request, the AP network selection application 610 receives a geo-tagged network identification list. The list may include information identifying various types of networks, such as small-cell LTE, macro cell RAN, etc.

The AP network selection application 610 instructs modem 555 on which networks to connect based on the stored subscription profiles and geo-cached data. For example, the UE 480 may prefer band scans on networks to which it has subscribed, in order to minimize inter-frequency scanning and perform discovery in a power-efficient way. Furthermore, in order to trigger the network selection logic in a power-efficient way, the modem 555 may be configured to periodically scan for a set of interesting networks, such as subscribed PLMN, ECGI, etc., and publish notification events to the AP network selection application 610. AP 610 detection of available small-cell networks permits the cellular modem 555 to override cell-selection determinations from the macro-network and execute its own cell selection and PLMN selection.

Figure 6:
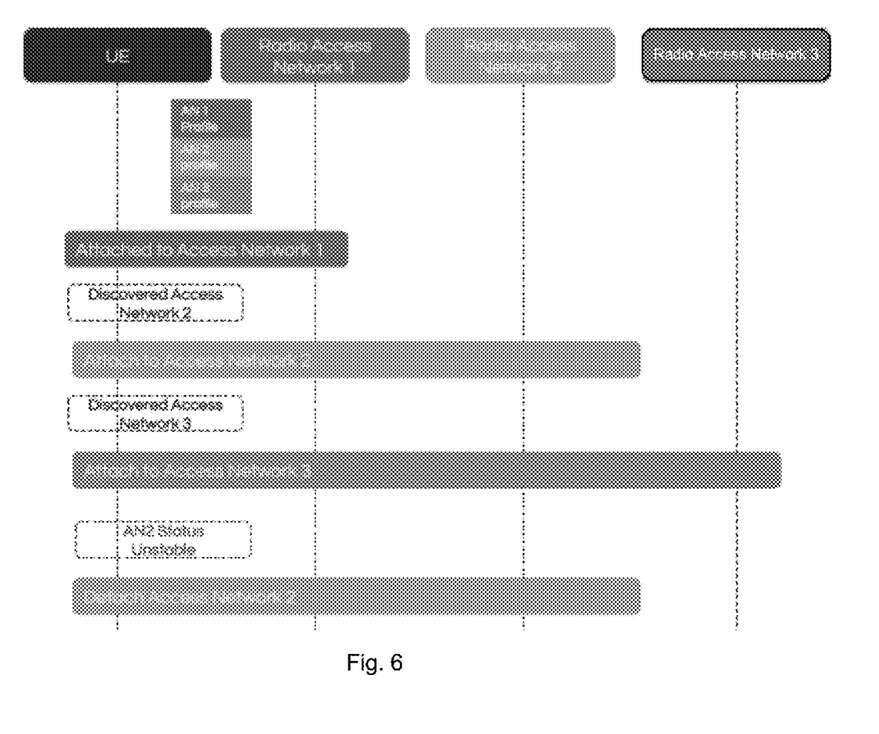
FIG. 6 illustrates an example of network attachment according to aspects of the disclosure.

FIG. 6 illustrates an example of network attachment and detachment. Network selection should trigger the UE 480 to attach to a specified network or node. Network attachment and detachment may use some of the parameters used for network discovery, such as signal strength, cost, quality, etc.

Figure 7:
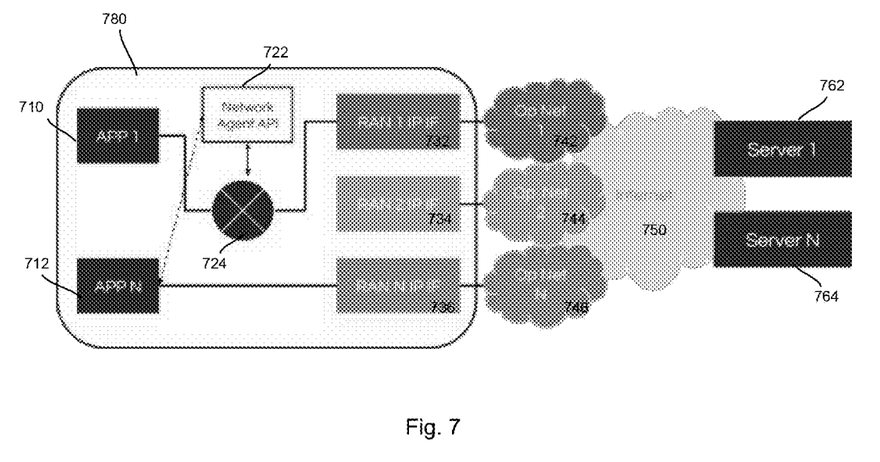
FIG. 7 illustrates an example of traffic steering according to aspects of the disclosure.

Upon discovery of a network, an application should be able to initiate a network attachment using the subscription profile that was provisioned as part of the subscription profiles (e.g., eUICC). As shown in FIG. 7, the UE is attached to network 1, which may be any type of network, such as a macro RAN, a small-cell LTE network, etc. While connected to network 1, the UE discovers network 2. The UE may automatically attach to network 2. In other examples, the UE may prompt the user for input regarding attaching to the network 2. While connected to networks 1 and 2, the UE further discovers access network 3 and similarly attaches. The UE may also detach, automatically or when instructed, from one or more of the attached networks. For example, when it is determined that the network 2 is unstable, the UE detaches from network 2.

According to some examples, network selection/deselection is controlled by a user-space policy system that determines the conditions upon which decisions should be made. For example, the policy system may determine that the UE should attach or detach based on minimum network quality metrics.

Each network attachment will result with an IP Address v4/v6/v4v6, provided by the network, that can be used to send/receive packets. There may be seamless IP mobility within a given access network (e.g., intra-RAT or inter-RAT mobility), however each disjoint network is manifested as a different IP session on the UE.

FIG. 7 illustrates different paths within a UE for a packet, depending on the network selected for a particular application. For example, UE 780 is running a plurality of applications 710, 712. UE 780 is also attached to a plurality of networks 742, 744, 746, which are communicatively coupled to servers 762, 764 through Internet 750. As each network attachment results in an IP address provided by the network to send/receive packets, the UE also includes a plurality of interfaces 732, 734, 736. Each interface 732-736 is dedicated to an IP address for a particular network.

A packet from the application is routed through the appropriate network to reach the end server. A flow selector process is created to proxy an application socket application programming interface (API) call and bind it to the appropriate network using the information provided by a network agent API 722. The network agent API 722 may communicate with the applications 710, 712 and interfaces 732-736 through router 724, or directly. The network agent API 722 maintains metric information on each attached network context. Applications may also directly query the network agent API 722 for network state information and create explicit socket binding to the network it requires (e.g., for VoLTE traffic).

Transport-layer protocols, such as QUIC, multipath transmission control protocol (MPTCP), etc., may be used to seamlessly switch between networks. As an example, QUIC can be modularly added on this infrastructure in various ways. For example, using zero-RTT retransmit, applications may quickly switch between networks based on network state transitions. If an RSRP drops below a certain threshold published by the network agent API 722, for example, retransmission on an alternate network interface may occur. As another example, when QUIC multipath is available, an application may simultaneously make use of multiple active network paths and quickly tune to fluctuating network conditions. As another example of adding QUIC, QUIC-to-TCP proxies could be implemented on the core network in order to provide backwards compatibility to applications that don't have server-side QUIC support.

Figure 8:
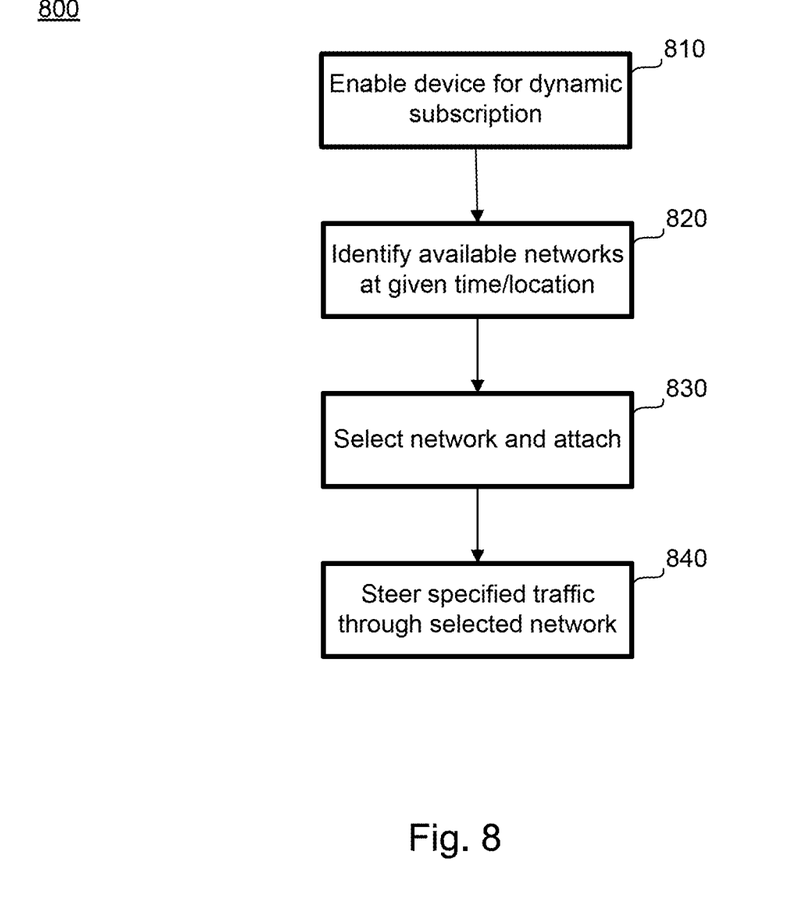
FIG. 8 is a flow diagram illustrating an example method according to aspects of the disclosure.

FIG. 8 illustrates an example method 800 for democratized network access by a user device. It should be understood that the following operations do not have to be performed in the precise order described below. Rather, various steps can be handled in a different order or simultaneously, and steps may also be added or omitted.

In block 810, the user device is enables for dynamic subscription. For example, subscription may be requested from a subscription management service by an application on the user device. Upon such request, the device may be subscribed. For example, subscription information such as passwords and the like may be downloaded to a secure element, such as a eUICC, of the device.

In block 820, networks available at a given time and/or location are identified. For example, if the user device is currently in a given geographical region, networks currently serving the given geographical region may be identified by the user device. Identification of the networks may be made by, for example, periodically polling.

In block 830, the user device selects a network and attaches thereto. Selection of the network may be based on any of a number of criteria, such as quality, cost, etc. It should be understood that multiple networks may be selected and attached at the same time. Moreover, the user device may also detach from the network if, for example, a quality of signals received from the network falls below a predetermined threshold.

In block 840, the UE steers traffic based on the selected network. For example, one network may be selected for communications by a first application, while a second network is selected for communications by a second application. For first and second networks may be different types, such as MNO RAN and small-cell LTE, or the same type. To steer traffic, an interface for each IP address for each network may be set up on the user device between the network and one or more applications for which the selected network will be used. Accordingly, all traffic to and from those one or more applications may be sent through the interface for the selected network.

Figure 9:
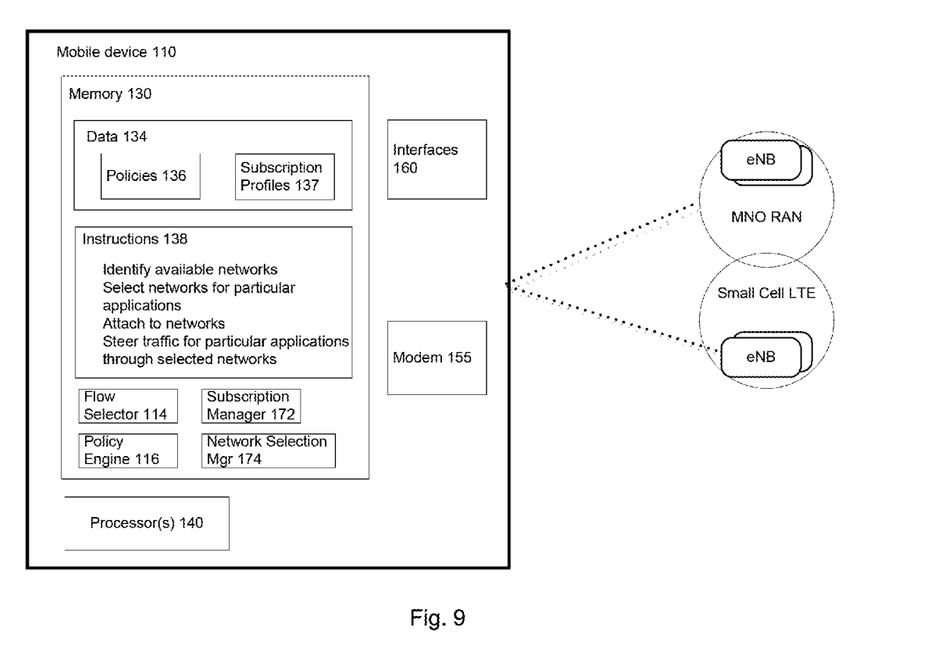
FIG. 9 is a block diagram illustrating an example user equipment according to aspects of the disclosure.

FIG. 9 illustrates an example system, including mobile device 110 communicatively coupled to a plurality of different types of networks. The networks, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The device 110 may be any type of computing device or system of computing devices capable of communicating over a network. Device 110 can contain one or more processors 140, memory 130 and other components typically present in general purpose computing devices. The memory 130 can store information accessible by the one or more processors 140, including instructions 138 that can be executed by the one or more processors 140.

Memory 130 can also include data 134 that can be retrieved, manipulated or stored by the processor 140. The memory can be of any non-transitory type capable of storing information accessible by the processor, such as a hard-drive, memory card, RAM, DVD, write-capable, etc.

The instructions 138 can be any set of instructions to be executed directly, such as machine code, or indirectly, such as scripts, by the one or more processors. In that regard, the terms "instructions," "applications," "steps" and "programs" can be used interchangeably herein. The instructions can be stored in object code format for direct processing by a processor, or in any other computing device language including scripts or collections of independent source code modules that are interpreted on demand or compiled in advance. Functions, methods and routines of the instructions are explained in more detail below.

Data 134 can be retrieved, stored or modified by the one or more processors 140 in accordance with the instructions 138. In one example, the data 134 may include policies 136, such as for network selection, attachment, and traffic steering. The data 134 may also include one or more subscription profiles 137, which may be used for connecting to networks. Although the subject matter described herein is not limited by any particular data structure, the data can be stored in internal or external memory, computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The instructions 138 may provide for identifying available networks, selecting and attaching to networks for particular applications, and steering traffic through the selected networks. To carry out these tasks, the device 110 may also employ a policy engine 116, flow selector 114, subscription manager 172, and network selection application 174. Moreover, the device 110 may include a modem 155 and one or more interfaces 160 for communicating with the different networks.

The one or more processors 140 can be any conventional processors, such as commercially available CPUs. Alternatively, the processors can be dedicated components such as an application specific integrated circuit ("ASIC") or other hardware-based processor. Although not necessary, the server 130 may include specialized hardware components to perform specific computing processes.

Although FIG. 9 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

The foregoing techniques may provide for increased Internet access to users. For example, enabling users to connect to the Internet through small cell LTEs, and to select which networks to use for particular types of Internet access, provides additional opportunities to send and receive data even where wireless local area networks are not available.

As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
    a memory;
    one or more processors in communication with the memory, the one or more processors configured to:
        request periodically a list of available networks;
        receive periodically the list of available networks, the available networks being geo-tagged;
        select a first cellular network for communication through a first application, the first cellular network supported by a first evolved packet core (EPC), the first cellular network is a mobile network operator (MNO) operating with a first set of cell-selection policies set by a first owner;
        attach to the selected first cellular network;
        set up a first interface for directing traffic through the first cellular network, the first interface being dedicated to a first IP address resulting from the attachment to the first cellular network;
        select a second cellular network for communication through a second application, the second cellular network being different from the first cellular network, the second cellular network supported by a second EPC different from the first EPC, the first cellular network and the second cellular network being disjoint networks, the second cellular network is a mobile virtual network operator (MVNO) operating with a second set of cell-selection policies set by a second owner;
        attach to the selected second cellular network, without requiring detachment from the selected first cellular network;
        set up a second interface for directing traffic through the second cellular network, the second interface being dedicated to a second IP address resulting from the attachment to the second cellular network;
        sort traffic for the first application and the second application using a flow selector, the flow selector configured to sort traffic based on criteria for sorting traffic between disjoint networks, wherein the criteria are determined based on a plurality of rules for steering traffic to disjoint networks included in a policy engine;
        steer, according to the sorting by the flow selector, a first traffic for the first application through the selected first cellular network using the first interface while remaining attached to the first cellular network and the second cellular network; and
        steer, according to the sorting by the flow selector, a second traffic for the second application through the selected second cellular network using the second interface while remaining attached to the first cellular network and the second cellular network;
        wherein the first traffic is different from the second traffic; and
        wherein at least one of the selection of the first cellular network overrides the first set of cell-selection policies or the selection of the second cellular network overrides the second set of cell-selection policies.

2. The system of claim 1, wherein selecting the first cellular network is based on at least one of quality of the network connection or a cost of receiving data through the first cellular network.

3. The system of claim 1, wherein the first application is different from the second application.

4. The system of claim 3, wherein the first cellular network and the second cellular network have different associated costs.

5. The system of claim 1, wherein the first cellular network is a cellular mobile network operator (MNO) radio access network (RAN) and the first EPC is an MNO EPC, and wherein the second cellular network is a mobile virtual network operator (MVNO) for an independently operated small cell long-term evolution (LTE) network.

6. The system of claim 1, wherein the flow selector sorts traffic between the appropriate applications and networks based on user-side criteria, including one or more of: user input, network pricing, type of traffic, traffic volume, network signal strength, signal quality, statistical data, historical data, state of the user device, or conditions surrounding the user device.

7. The system of claim 6, wherein the first traffic has a first signal quality requirement and the second traffic has a second signal quality requirement lower than the first signal quality requirement.

8. The system of claim 6, wherein the state of the user device corresponds to a type of movement of the user device.

9. The user device of claim 1, wherein at least one of selecting the first cellular network or selecting the second cellular network is performed automatically in response to detecting the network and determining that the first application or the second application meet a predefined set of criteria.

10. The user device of claim 1, wherein the policy engine is configured to receive statistical data on performance of the plurality of networks from a remote database.

11. The system of claim 1, wherein the traffic steering rules are generated in response to a condition.

12. The system of claim 1, further comprising a user-space policy system configured to determine when to detach from at least one of the first cellular network or the second cellular network based on conditions associated with the user device.

13. The system of claim 12, wherein the conditions associated with the user device include one or more of: user input, pricing, type of traffic, traffic volume, statistical data, historical data, or state of the user device.

14. The system of claim 1, wherein a first subscription profile for attaching to the first cellular network and a second subscription profile for attaching to the second cellular network are stored in the system, the first subscription profile and the second subscription profile each having a respective password.

15. A method, comprising:
requesting periodically, with one or more processors, a list of available networks;
receiving periodically, with the one or more processors, the list of available networks, the available networks being geo-tagged;
selecting, with the one or more processors, a first cellular network for communication through a first application, the first cellular network supported by a first evolved packet core (EPC), the first cellular network is a mobile network operator (MNO) operating with a first set of cell-selection policies set by a first owner;
attaching to the selected first cellular network;
setting up, with the one or more processors, a first interface for directing traffic through the first cellular network, the first interface being dedicated to a first IP address resulting from the attachment to the first cellular network;
selecting, with the one or more processors, a second cellular network for communication through a second application, the second cellular network being different from the first cellular network, the second cellular network supported by a second EPC different from the first EPC, the first cellular network and the second cellular network being disjoint networks, the second cellular network is a mobile virtual network operator (MVNO) operating with a second set of cell-selection policies set by a second owner;
attaching to the selected second cellular network, without requiring detachment from the selected first cellular network;
setting up, with the one or more processors, a second interface for directing traffic through the second cellular network, the second interface being dedicated to a second IP address resulting from the attachment to the second cellular network;
sorting traffic for the first application and the second application using a flow selector, the flow selector configured to sort traffic based on criteria for sorting traffic between disjoint networks, wherein the criteria are determined based on a plurality of rules for steering traffic to disjoint networks included in a policy engine;
steering, with the one or more processors according to the sorting by the flow selector, a first traffic for the first application through the selected first cellular network using the first interface while remaining attached to the first cellular network and the second cellular network; and
steering, with the one or more processors according to the sorting by the flow selector, a second traffic for the second application through the selected second cellular network using the second interface while remaining attached to the first cellular network and the second cellular network;
wherein the first traffic is different from the second traffic; and
wherein at least one of the selection of the first cellular network overrides the first set of cell-selection policies or the selection of the second cellular network overrides the second set of cell-selection policies.

16. The method of claim 15, wherein selecting the first cellular network is based on at least one of quality of the network connection or a cost of receiving data through the first cellular network.

17. The method of claim 15, wherein the first application is different from the second application.

18. The method of claim 17, wherein the first cellular network and the second cellular network have different associated costs.

19. The method of claim 15, wherein at least one of selecting the first cellular network or selecting the second cellular network is performed automatically in response to detecting the network and determining that the first application or the second application meet a predefined set of criteria.

20. The method of claim 15, wherein the policy engine is configured to receive statistical data on performance of the plurality of networks from a remote database.

21. The method of claim 15, wherein the traffic steering rules are generated in response to a condition.

22. A non-transitory computer-readable medium storing instructions executable by a processor to perform a method, comprising:
requesting periodically a list of available networks;
receiving periodically the list of available networks, the available networks being geo-tagged;
selecting a first cellular network for communication through a first application, the first cellular network supported by a first evolved packet core (EPC), the first cellular network is a mobile network operator (MNO) operating with a first set of cell-selection policies set by a first owner;
attaching to the selected first cellular network;
setting up a first interface for directing traffic through the first cellular network, the first interface being dedicated to a first IP address resulting from the attachment to the first cellular network;
selecting a second cellular network for communication through a second application, the second cellular network being different from the first cellular network, the cellular second network supported by a second EPC different from the first EPC, the first cellular network and the second cellular network being disjoint networks, the second cellular network is a mobile virtual network operator (MVNO) operating with a second set of cell-selection policies set by a second owner;
attaching to the selected second cellular network, without requiring detachment from the selected first cellular network;
setting up a second interface for directing traffic through the second cellular network, the second interface being dedicated to a second IP address resulting from the attachment to the second cellular network;

sorting traffic for the first application and the second application using a flow selector, the flow selector configured to sort traffic based on criteria for sorting traffic between disjoint networks, wherein the criteria are determined based on a plurality of rules for steering traffic to disjoint networks included in a policy engine;

steering, according to the sorting by the flow selector, a first traffic for the first application through the selected first cellular network using the first interface while remaining attached to the first cellular network and the second cellular network; and steering, according to the sorting by the flow selector, a second traffic for the second application through the selected second cellular network using the second interface while remaining attached to the first cellular network and the second cellular network;

wherein the first traffic is different from the second traffic; and wherein at least one of the selection of the first cellular network overrides the first set of cell-selection policies or the selection of the second cellular network overrides the second set of cell-selection policies.

23. The method of claim 22, wherein selecting the first cellular network is based on at least one of quality of the network connection or a cost of receiving data through the first cellular network.

24. The method of claim 22, wherein at least one of selecting the first cellular network or selecting the second cellular network is performed automatically in response to detecting the network and determining that the first application or the second application meet a predefined set of criteria.

* * * * *